UNITED STATES PATENT OFFICE.

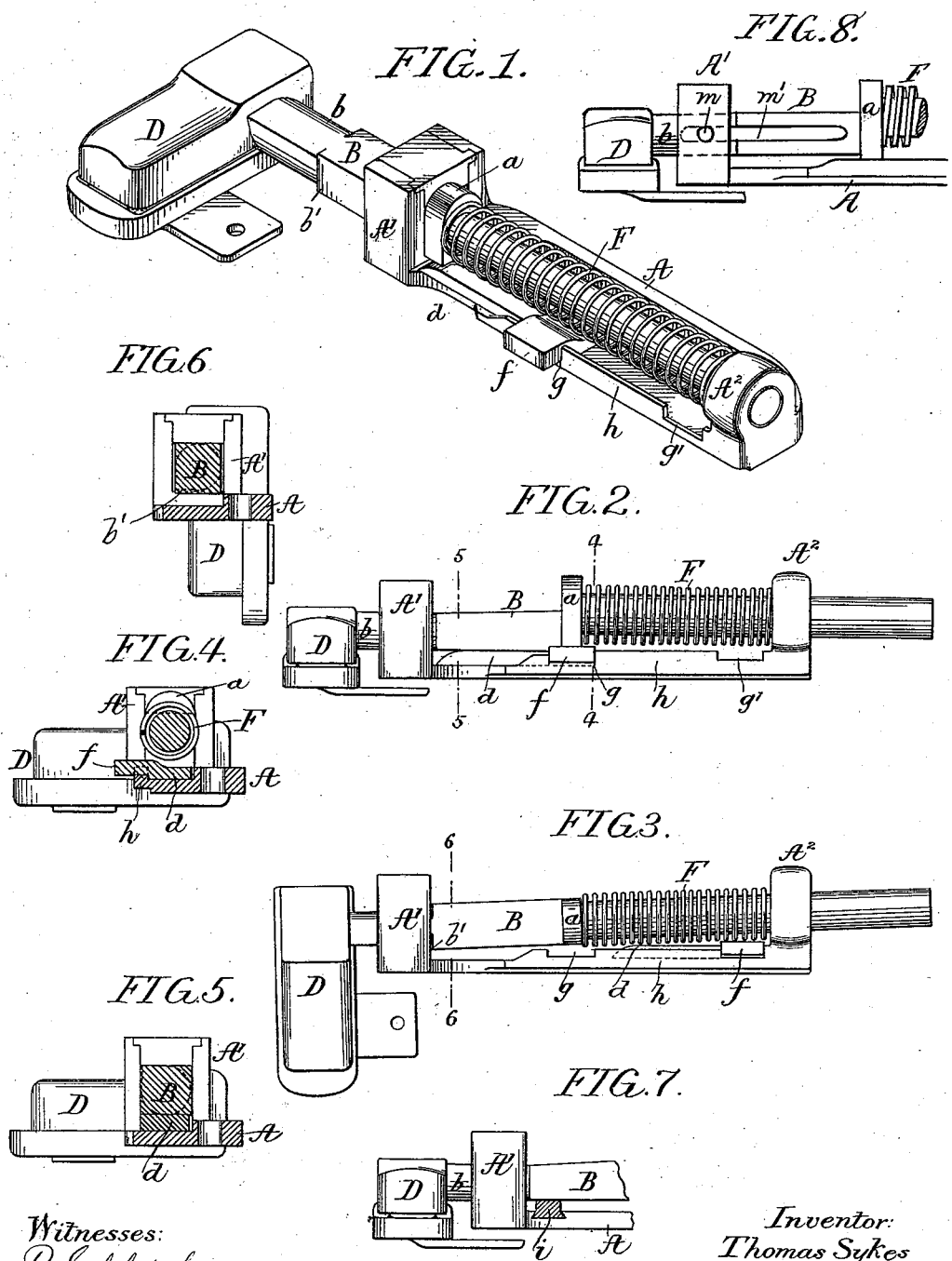

THOMAS SYKES, OF PHILADELPHIA, PENNSYLVANIA.

LOOM-TEMPLE.

SPECIFICATION forming part of Letters Patent No. 534,531, dated February 19, 1895.

Application filed October 29, 1894. Serial No. 527,171. (No model.)

*To all whom it may concern:*

Be it known that I, THOMAS SYKES, a citizen of the United States, residing in Philadelphia, Pennsylvania, have invented certain Improvements in Loom-Temples, of which the following is a specification.

My invention consists of certain improvements in the loom temple forming the subject of my Letters Patent No. 525,566, dated September 4, 1894, the main object of my present improvements being to prevent accidental turning of the temple shank in its bearings when the shank has been pushed inward to its full extent and the reduced portion of the shank occupies the forward guide.

A further object is to prevent vertical or lateral play of the shank in the forward guide.

These objects I attain in the manner hereinafter set forth, reference being had to the accompanying drawings, in which—

Figure 1, is a perspective view of a loom temple constructed in accordance with my invention. Fig. 2, is a side view of the same showing the temple shank pushed fully inward but locked so as to prevent turning. Fig. 3, is a similar view showing the shank unlocked so as to permit of the turning of the same. Fig. 4, is a transverse section on the line 4—4, Fig. 2. Fig. 5, is a transverse section on the line 5—5, Fig. 2. Fig. 6, is a transverse section on the line 6—6 Fig. 3; and Figs. 7 and 8 are side views illustrating modifications of the invention.

A represents the fixed guide plate of the temple, adapted to be secured to the breast beam of the loom in the usual manner, and B is the temple shank having at its forward end the roller box or casing D, the said shank having a rectangular portion adapted to a forward guide A' on the plate A and a cylindrical portion adapted to a rear guide $A^2$ on said plate, a spring F being interposed between said rear guide $A^2$ and the rectangular portion of the temple shank so as to serve to normally project the latter, the extent of such projection being limited by contact of an enlarged portion or lug $a$ of the temple shank with the cap or top plate of the forward guide.

Adjacent to the roller box or casing D the shank B of the temple is reduced as shown at $b$ so that when the shank is driven inward until this reduced portion occupies the forward guide A' the shank can be turned in said guide so as to permit the roller box or casing D to be turned down out of the way of the fabric, in order to permit of the ready picking out of imperfect shots. It occasionally happens, however, that the temple is accidentally forced inward until its reduced portion occupies the forward guide, as for instance, when the shuttle fails to properly enter the box and strikes the temple on the beating up of the lathe, and at such times it is advisable to prevent the turning of the temple shank in its guide. For this reason I provide the temple with a movable locking bolt which normally engages with the shank of the temple when the latter is pushed inward and prevents the turning of said shank in its guides, the bolt, however, being capable of retraction or withdrawal so that the temple shank is then free from its influence and can be turned in its guides when pushed so far inward that the reduced portion of the shank occupies the forward guide.

The preferable form of locking bolt is that shown in Figs. 1 and 4, wherein the bolt is represented as in the form of a plate $d$ resting on the base plate A of the temple beneath the sliding shank B, said plate having a laterally projecting lug or finger $f$, which may be adapted to either of two notches $g\, g'$ formed in a flange $h$ at one side of the base of the temple.

When the finger $f$ occupies the forward notch $g$ the rectangular shank B of the temple bears upon the locking bolt when the shank is pushed inward as shown in Fig. 2. Hence any turning of the temple shank in its guides is effectually prevented, but if the locking bolt $d$ is drawn backward so that its finger $f$ occupies the rearward recess $g'$, as shown in Fig. 3, the temple shank when pushed fully inward will be free from the influence of the locking bolt and hence will not be retained but can be turned in its guides so as to carry the roller box or casing away from the woven web.

Although I prefer a longitudinally sliding bolt of the character described as a means of locking the temple shank in order to prevent turning of the same, other forms of bolt may be used for the same purpose. For instance, in Fig. 7, I have shown a construction in which a laterally sliding bolt $i$ is adapted to a transverse guide formed in the base of the temple, this bolt normally bearing against the under side of the temple shank as shown so as to lock the same, but being capable of withdrawal laterally so as to free said shank, or the forward guide may have a locking bolt $m$ passed transversely through the same and adapted to engage with a slot $m'$ in the temple shank, as shown for instance in Fig. 8, the shank being free to turn in its guides on the withdrawal of the bolt.

The turning of the temple shank in its guides causes a slight inclination of said shank as shown in Fig. 3, and for this reason the opening formed in the guide $A^2$ for the reception of the cylindrical portion of the shank is beveled, as shown by dotted lines, so as to provide for this disposition of the temple shank and yet prevent any excessive looseness of fit of the cylindrical portion of the shank in said outer guide.

The opening in the forward guide $A'$ is slightly wider than its height and the portion B of the temple shank is preferably so formed as to completely fill said forward guide $A'$, as shown in Fig. 5, so as to prevent any vertical or lateral motion of the shank in said guide as the shank is reciprocated longitudinally, the reduced portion $b$ of the shank being rounded so as to permit of the turning down of the roller box, as shown in Fig. 6, in which case the shoulder $b'$ formed by reducing the shank, engages with the bottom portion of the forward guide, the reduced portion in this case vertically filling said guide so as to prevent any rise of the temple shank, such as would release the same and permit its projection by the spring.

Having thus described my invention, I claim and desire to secure by Letters Patent—

1. The combination of the fixed plate of the temple and its guides, with the sliding temple shank normally prevented from turning by its guide, but having a reduced portion at the outer end whereby it may be turned in its guides when pushed fully inward, the spring for projecting the shank, and a removable locking bolt for preventing accidental turning of the temple when its reduced portion occupies the guide, substantially as specified.

2. The combination of the fixed plate of the temple and its guides, a sliding temple shank normally prevented from turning by its guides, but having a reduced portion to permit turning of the temple when the same is pushed fully inward, the spring for projecting the shank, and a longitudinally sliding bolt which, when in the forward position engages with the temple shank and prevents turning of the same, but when retracted, exercises no locking influence on the shank, substantially as specified.

3. The combination of the fixed plate of the temple and its guides, the sliding temple shank normally prevented from turning by its guides, but having a reduced portion to permit turning of the temple when the same is fully pushed inward, the spring for projecting the shank, a longitudinally sliding bolt adapted when projected to engage with and lock the temple shank, and when retracted, to release said shank, a projecting finger on said bolt, and a flange on the fixed plate of the temple, said flange having notches for receiving said finger when the bolt is projected or retracted, substantially as specified, 4. The combination of the fixed plate of the temple and its guides, the sliding temple shank normally prevented from turning by its guides but having a reduced portion to permit turning of the temple when the same is pushed fully inward, and a spring for projecting the temple, the reduced portion of the shank forming a shoulder for engagement with the guide to hold the temple in the retracted position, and said reduced portion filling the guide, so as to prevent disengagement of said shoulder except by a turning movement of the shank, substantially as specified.

In testimony whereof I have signed my name to this specification in the presence of two subscribing witnesses.

THOMAS SYKES.

Witnesses:
  MURRAY C. BOYER,
  JOSEPH H. KLEIN.